July 10, 1934.         C. RINGWALD         1,965,668
SUPPORT FOR ELECTRIC MOTORS AND FANS
Filed July 30, 1932
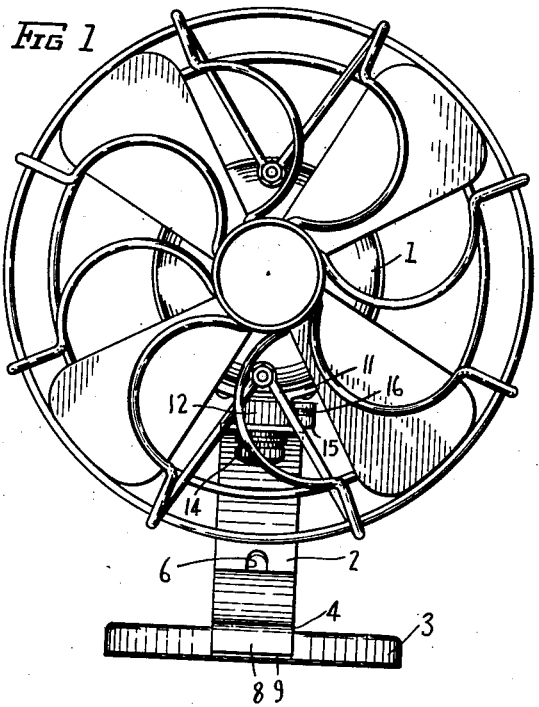
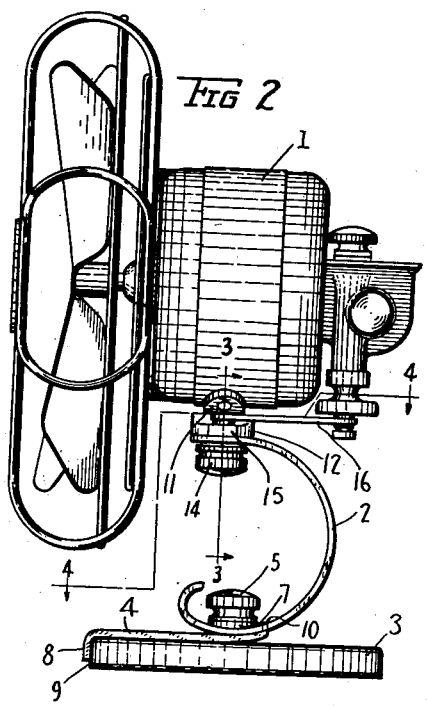
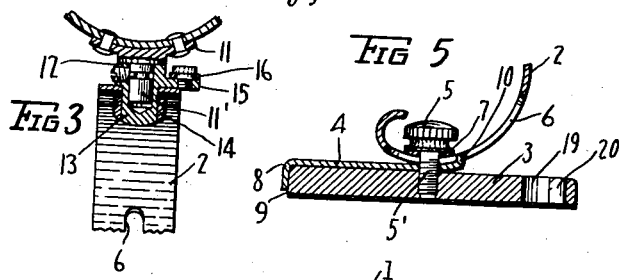
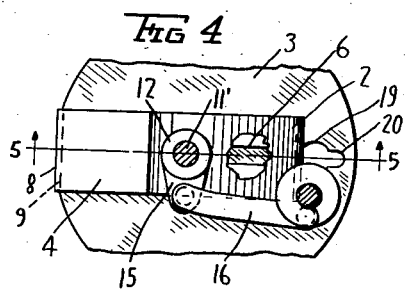
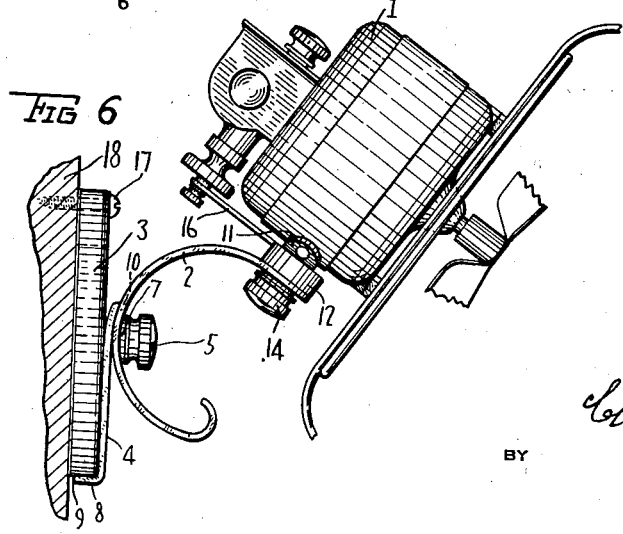
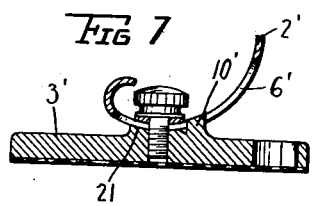
INVENTOR
Clarence Ringwald
BY
ATTORNEYS Patented July 10, 1934

1,965,668

UNITED STATES PATENT OFFICE 1,965,668

SUPPORT FOR ELECTRIC MOTORS AND FANS

Clarence Ringwald, North Hampton, Ohio

Application July 30, 1932, Serial No. 626,427

7 Claims. (Cl. 248—15)

This invention relates to improvements in mountings for electric fans of the desk or wall type.

One object of the invention is the provision of a resilient supporting medium whereby the vibrations of the fan are eliminated.

A further object of the invention in connection with the resilient supporting medium is to provide an adjustable mounting, the adjustable connections being made at a point where weakening of the parts is obviated.

In the accompanying drawing:

Fig. 1 is a front elevation of an oscillating fan and its mounting.

Fig. 2 is a side elevation.

Fig. 3 is a fragmentary transverse section on the line 3—3 of Fig. 2.

Fig. 4 is a fragmentary horizontal section on the line 4—4 of Fig. 2.

Fig. 5 is a fragmentary vertical section on the line 5—5 of Fig. 4.

Fig. 6 is a partial side elevation of the fan when used as a wall fan, the view also showing one of the possible positions of adjustment.

Fig. 7 is a view similar to Fig. 5 showing a modified form of connection of the mounting and base.

Referring to the drawing, 1 represents the fan motor which with the fan and guard is supported at the upper end of a resilient supporting member 2 formed of a spring metal strip curved to provide the desired resiliency. The lower side of the spring member 2 is adjustably secured to a comparatively heavy base 3 with a secondary aligning strip 4 interposed between the base and the spring member.

To alter the angle of the fan, the spring member is adjustably secured at its lower side to the base 1. The means of connection consists of a large headed knurled screw 5, the stem 5' of which passes through an elongated slot 6 formed in the lower portion of the spring member 2 and through an opening in the interposed strip 4 and is threaded into the base 1 near the center thereof. The length of the slot 6 determines the degree in which the position of the fan may be adjusted. A convex washer 7 under the knurled head of the screw 5 is used to provide ample bearing on the curved surface of the spring member 2.

In order to prevent the spring member from turning when the screw 5 is being tightened, or to maintain alignment at all times, the spring member 2, the strip 4 and the base 3 are formed as follows: The strip 4 is provided with a downturned end 8 which is placed against the flattened edge portion 9 of the base 3. The other end of the strip extends a short distance beyond the screw 5, and is curved to the same curvature as the outer surface of the spring member 2 to provide a partial support for the same at this point, and terminates in a small tongue 10 (Fig. 5) which is bent upwardly and projects into the slot 6.

With the adjustable connections formed as just described at the lower portion of the spring member 2, the width of the slot 6 is held to a minimum, being only sufficient to accommodate the stem of the screw 5 which may be of comparatively small size. Therefore, the spring member is not weakened by an unduly large slot. The prevailing tendency is to make fans of this type oscillatory, in which fans the stems of the pivots are necessarily comparatively large in diameter. Therefore, if the adjustable feature was incorporated in the upper end of the spring member, the slot would necessarily be so large as to weaken that member, or necessitate the addition of re-enforcing metal at this portion, whereby the advantage of manufacturing the spring member from strip stock would be lost.

A pivotal arrangement for an oscillating fan is shown in the drawing. Referring to Figs. 3 and 4, a saddle member 11 having a cylindrical extension 11' is riveted to the lower side of the fan motor body. The extension 11 is inserted downwardly in the bore of a hollow member 12 which has a threaded extension 13 which is of comparatively large size as seen in Fig. 3, and which passes downwardly in a circular opening at the upper end of the spring member 2 and is rigidly secured there by a nut 14. Projecting from the side of the member 12 is an arm 15 to which one end of a link 16 is pivotally connected, the other end of the link being also pivotally connected to an oscillating drive mechanism of any suitable type which is merely indicated in general in the present instance.

It will thus be seen that by providing the adjustable feature at the lower portion of the spring member as described, the advantages of quantity production in manufacture are not lost, whereby oscillating or non-oscillating fans may be constructed using the same spring member. In a non-oscillating fan the upper opening need be no larger than the shank of the screw 5. Yet as the spring member is not materially weakened by a single large opening as compared to the weakening effect of a large slot, the same spring member may be used in both types of fans.

In Fig. 6 the fan is shown as a wall fan, it being supported by a screw 17 inserted in the wall 18. The screw serves as a hook, there being in the base 3 an opening 19 (Fig. 4) in alignment with the spring member 2 and locator strip 4 large enough to permit the passage therethrough of the head of the screw, and a smaller opening 20 to accommodate the body portion of the screw, connected with the larger opening 19.

A modified form of adjustable connection with the base is shown in Fig. 7. In this form the base 3' is formed with a curved upper surface 21 of substantially the same width as the strip spring member 2' whereby an additional partial support to the spring member 2' is given. In line with the slot 6' of the spring member 2' is an upwardly projecting post 10' which projects into the slot 6' of the spring member.

From the foregoing description it will be seen that I have devised a simple, inexpensive and attractive form of resilient fan mounting, which in combination with the comparatively heavy base tends to damp out fan motor vibrations, as the rebound of the vibrations is insufficient to disturb or lift the base.

Having thus described my invention, I claim:

1. In a mounting for a fan and motor, a base, a curved support having an elongated slot in its lower end, means extending through the slot to adjustably secure said support to the base, means carried by the base and extending into the slot to hold the support from turning with relation to the base, and means for connecting the motor to the upper end of said support.

2. In a mounting for a fan and motor, a base, a curved support having an elongated slot in its lower end, a screw extending through said slot to adjustably secure said support to the base, a projection carried by the base and extending into said slot to prevent said support from turning with relation to the base, and means for connecting the motor to the upper end of said support.

3. In a mounting for a fan and motor, a base, a curved spring-metal support having an elongated slot in its lower end, a screw extending through the slot to adjustably secure said support to said base, a plate interposed between the base and support, said plate having a down-turned end overlying the edge of the base and an up-turned projection extending into said slot, and means for connecting the motor to the upper end of said support.

4. In a mounting for a motor, a base, a curved support having an elongated slot in its lower end, an integral curved seat formed on said base for the lower end of said support, an integral projection on said base projecting into said slot, a screw extending into said slot and said base, and means for connecting the motor to the upper end of said support.

5. In a mounting for a fan and motor, a base, a curved support formed of a strip of resilient metal, means for adjustably connecting one end only of said support to said base, and means for connecting the motor solely to the other end of said support, all portions of the support adapted to be connected to the base being curved whereby an adjustment thereof relatively to the base changes the angularity of the motor.

6. In a mounting for a fan and motor, a base, a substantially C-shaped support formed of a strip of resilient metal having an elongated slot in one end, a screw extending through the slot to adjustably secure the slotted end only of said support to the base, and means for connecting the motor solely to the other end of said support, all portions of the support adapted to be connected to the base being curved whereby an adjustment thereof relatively to the base changes the angularity of the motor.

7. In a mounting for a fan and motor, a base, a substantially C-shaped support formed of a strip of resilient metal, means to adjustably secure one end only of said support to said base, means to hold the support from turning relatively to said base, and means for connecting the motor solely to the other end of said support, all portions of the support adapted to be connected to the base being continuously curved whereby an adjustment thereof relatively to the base changes the angularity of the motor.

CLARENCE RINGWALD.